United States Patent [19]

Okumura et al.

[11] Patent Number: 5,138,003

[45] Date of Patent: Aug. 11, 1992

[54] RING OPENING METHOD AND REACTION SOLUTION

[75] Inventors: Kin-ichi Okumura, Kamakura; Munetoshi Nakano, Kurashiki; Hirotoshi Tanimoto, Kamakura; Motoyuki Yamato, Kanagawa, all of Japan

[73] Assignee: Nippon Zeon Co., Ltd., Tokyo, Japan

[21] Appl. No.: 764,992

[22] Filed: Sep. 23, 1991

Related U.S. Application Data

[63] Continuation of Ser. No. 355,579, May 23, 1989, abandoned.

[30] Foreign Application Priority Data

Jun. 4, 1988 [JP] Japan .................. 63-137896

[51] Int. Cl.$^5$ .................. C08G 61/02; C08F 279/02
[52] U.S. Cl. .................. 526/283; 526/75; 526/281; 526/161; 525/289; 525/290; 525/245; 264/328.2; 264/328.6; 264/331.13
[58] Field of Search .............. 526/283, 75, 281, 161; 525/289, 290, 245; 264/328.2, 328.6; 585/362

[56] References Cited

U.S. PATENT DOCUMENTS

| | | | |
|---|---|---|---|
| 2,259,496 | 10/1941 | Soday | 526/75 |
| 2,259,497 | 10/1941 | Soday | 526/75 |
| 2,371,499 | 3/1945 | Britton et al. | 526/283 X |
| 4,703,098 | 10/1987 | Matlack | 526/283 |
| 4,751,337 | 6/1988 | Espy et al. | 585/362 |
| 4,843,185 | 6/1989 | Ware et al. | 526/75 X |
| 4,853,435 | 8/1989 | Yamato et al. | 525/193 |
| 4,899,005 | 2/1990 | Lane et al. | 585/360 |

Primary Examiner—Fred Teskin
Attorney, Agent, or Firm—Thoburn T. Dunlap; George A. Kap

[57] ABSTRACT

Described herein is an oily, transparent reaction product which is prepared by heat treating at 110°–220° C. a dicyclopentadiene and a vinyl aromatic compound. This reaction product can be polymerized by ring-opening in presence or absence of a norbornene monomer to produce a thermoset polymer. Freezing point of the reaction product is below 10° C.

32 Claims, No Drawings

RING OPENING METHOD AND REACTION SOLUTION

This is a continuation of copending application Ser. No. 07/355,579 filed on May 23, 1989, now abandoned.

BACKGROUND OF THE INVENTION

The method for the ring-opening polymerization of a norbornene monomer, such as dicyclopentadiene (DCPD) or methyl tetracyclododecene (MTD), in a mold, and the addition of an elastomer as an impact modifier, is well known.

For example, in Japanese Kokai patent No. Sho 58[1983]-129013, a method for the manufacture of a thermosetting DCPD homopolymer using a metathesis catalyst by the reaction injection molding (RIM) method is disclosed.

If an elastomer is added to one or both of the two reaction solutions in this case, it has been shown that the flexural modulus is decreased somewhat but the impact strength is increased by 5-10 times.

Furthermore, in Japanese Kokai Patent No. Sho 59[1984]-51911, RIM of cyclic olefins containing norbornene rings, such as DCPD and MTD, has been disclosed. Even in this bulk polymerization method, the mixing of an elastomer as an impact modifier into the monomer reaction solution is shown.

The ring-opening polymers in these disclosed methods have relatively good performance in terms of a variety of physical properties required in engineering plastics, such as impact strength, high modulus of elasticity, heat resistance, etc. However, in regards to the stringent performance required to date, it is still difficult to say that they are necessarily sufficient.

For example, it has been pointed out that the glass transition temperature (Tg) of the DCPD homopolymers obtained by these methods is insufficient. As an improvement method, a method has been proposed in which comonomers, like tetracyclododecadiene, trimethylolpropane-tris(5-norbornene-2-carboxylate), etc., having two or more reactive double bonds, are copolymerized so that the number of crosslinkings is increased by cleavage during the polymerization, see Japanese Kokai Patent No. Sho 61[1986]-179214. However, in this method, special comonomers which are difficult to obtain are used.

Furthermore, U.S. Pat. No. 4,703,098, discloses the use of a mixture of DCPD and its oligomers, obtained by the heat treatment of DCPD. From said heat-treated product, it is possible to manufacture a thermosetting resin with an improved glass transition temperature. However, in the storage of said heat-treated product, a white micropowder is deposited which makes handling thereof difficult.

For example, if the concentrations of trimers or tetramers of cyclopentadiene present in the heat-treated product are high, part of the trimers and tetramers form a white micropowder which is precipitated. This phenomenon is especially strong when the concentrations of the trimers and tetramers are more than 15 weight percent or the storage temperature is less than 10° C. Owing to this settling phenomenon, the piping of the reaction equipment becomes plugged and variations in the compositions or physical properties of the thermosetting resins occur. In order to prevent these problems, the heat-treated product is heated during storage, the storage tank is stirred, or other troublesome operations are required. In addition, with an increase in the trimers and tetramers, although the glass transition temperature will increase, the impact resistance will be reduced. In particular, there is a drawback in that the impact resistance is reduced after the heat treatment test.

SUMMARY OF THE INVENTION

The present invention relates to a method for the manufacture of ring-opened thermosetting resin by the bulk polymerization of a heat-treated mixture of a norbornene monomer and a vinyl aromatic compound, and its reaction products. It also relates to a method for the manufacture of a thermosetting resin having an excellent operability, a high thermal deformation temperature, and an improved impact strength. This invention also pertains to a reaction solution containing heat-treated mixture of DCPD and a vinyl aromatic compound and reaction products thereof.

DETAILED DESCRIPTION OF THE INVENTION

As a result of the investigations to overcome the problems mentioned above, the present inventors have discovered that the oily product obtained by the heat treatment of a mixture of a DCPD and a vinyl aromatic compound has a high polymerization activity and good processability as a monomer and that a thermosetting resin can be obtained. Such thermosetting resins, prepared by polymerizing the oily product alone or with a norbornene monomer, have high glass transition point, and an improved impact strength or resistance, especially impact strength after heat treatment test. The ring-opening polymerization of these materials is carried out in the presence of a metathesis catalyst system inside a mold of a desired shape.

The gist of the present invention is a method for the manufacture of a ring-opened thermosetting resin characterized by the fact that an oily product (A), obtained by the heat treatment of a mixture of a dicyclopentadiene and a vinyl aromatic compound is allowed to undergo bulk polymerization in the presence of a metathesis catalyst in a mold. The oily product can be polymerized in presence of a norbornene monomer.

Furthermore, the present invention provides a method for the manufacture of a thermosetting resin characterized by the fact that the previously mentioned oily product (A), or a mixture of product (A) and a norbornene monomer (B), and an elastomer (C), is allowed to undergo ring-opening bulk polymerization in the presence of a metathesis catalyst.

Furthermore, the present invention is also directed to reaction solutions containing the previously mentioned oily product (A), or a mixture of said product (A) and a norbornene monomer (B), as a monomer component, and a metathesis catalyst, wherein one formulation would contain the oily product and a catalyst of the metathesis catalyst system whereas another formulation would contain an activator or cocatalyst of the metathesis catalyst system. Other ingredients can be included in either one or both of the formulations.

The constituent elements of the present invention are described in greater detail below.

The dicyclopentadienes (DCPDs) are selected from DCPD itself and substituted DCPDs containing substituents selected from polar and nonpolar groups. The nonpolar groups, of which there can be one or more on a DCPD, are selected from hydrogen, alkyl groups of 1-20 carbon atoms, aryl and alkaryl groups of 6-14 carbon atoms, and saturated and unsaturated hydrocarbon cyclic groups formed with two ring carbon atoms on a DCPD containing a total of 4–8 carbon atoms. In a preferred embodiment, the nonpolar groups are selected from hydrogen, alkyl groups of 1-3 carbon atoms, and monounsaturated cyclic groups of 5 carbon atoms. The polar substituents are selected from anhydrides, nitriles, acrylates and methacrylates, acetates, halogens, carboxyls, carbonyls, and the like. Dicyclopentadiene itself is preferred.

If DCPDs used as a feedstock in the present invention have a purity generally greater than 90 percent by weight, preferably greater than 95 percent by weight, it is unnecessary to purify same. Their heat-treated products have high activities as monomers and render ring-opening polymers having good physical properties.

The dicyclopentadienes generally contain low boiling point impurities and high boiling point impurities. Examples of the former mixture, for example, include $C_{4-6}$ hydrocarbon compounds, codimer compounds of cyclopentadiene (CPD) with butadiene, isoprene, piperylene and other conjugated diolefins such as vinyl norbornene, isopropenyl norbornene, and propenyl norbornene. Furthermore, examples of the latter include trimers of CPD and the codimer compounds of CPD and isoprene such as methyl bicyclononadiene.

Since the $C_{4-6}$ hydrocarbon compounds cause poor molding in the reaction injection molding, they should be removed. However, in the present invention, there is a sufficient polymerization activity even if the purity is less than 98 percent by weight.

The dicyclopentadienes which can be used in the present invention are DCPD itself, its methyl substituent, ethyl substituent, and other alkyl substituents containing 1 to 6 carbons in the alkyl group. The feedstock dicyclopentadienes are endo isomers, exo isomers, or their mixtures. By heating, dicyclopentadienes are decomposed into cyclopentadiene or its alkyl substituents.

The vinyl aromatic compounds which are used in the present invention are those which can undergo the Diels-Alder reaction with cyclopentadiene (CPD). As specific examples, styrene, α-methylstyrene, vinyltoluene, isopropenyltoluene, p-t-butylstyrene, halogenated styrene and other styrenes, vinylnaphthalene and other vinylnaphthalenes may be mentioned. Among these, the styrenes are preferred.

The mixing ratios of DCPDs and vinyl aromatics (DCPD/VA) in molar ratios are 95/5 to 20/80, preferably 80/20 to 25/75, and more preferably 70/30 to 30/70.

If DCPDs are used in a large amount, the oligomers of cyclopentadiene are generated in a large quantity, no oily product is formed, a waxy product is obtained, and handling is difficult. In addition, the impact resistance of the thermosetting resin is damaged. In contrast, if vinyl aromatics are used in a large amount, the homopolymers of vinyl aromatics are formed in a large quantity or unreacted vinyl aromatics will remain. As a result, the physical properties of the thermosetting resins will decrease.

Furthermore during the heat treating, presence of benzene, toluene, xylene, or other inert solvents in the heat-treating reaction is acceptable. In this case, it is necessary to have an operation to remove the solvent after heat treating. Therefore, it is preferable not to use a solvent if possible.

If necessary, a norbornene monomer (B) may be mixed with the heat-treated product (A) of a DCPD and a vinyl aromatic compound for use in the present invention. The norbornene monomers suitable herein contain at least one, preferably at least two norbornene groups. The norbornene monomers include substituted or unsubstituted norbornenes, cyclopentadienes, dicyclopentadienes, dihydrodicyclopentadienes, tricyclopentadienes, tetracyclopentadienes, tetracyclododecenes, and other norbornene type monomers which contain at least one norbornene group in their structure.

Specific examples of the norbornene-type monomers suitable herein include cyclopentadiene, tetracyclododecene, methyl tetracyclododecene, ethyl tetracyclododecene, ethylidene tetracyclododecene, phenyl tetracyclododecene, 2-norbornene, 5-methyl-2-norbornene, 5,6-dimethyl-norbornene, 5-ethyl-2-norbornene, 5-butyl-2-norbornene, 5-hexyl-2-norbornene, 5-octyl-2-norbornene, 5-dodecyl-2-norbornene, norbornene, norbornadiene, ethylidene norbornene, vinyl norbornene, and phenyl norbornene.

Among these, tricyclic compounds represented by DCPDs and tetracyclic compounds like tetracyclododecene, methyl tetracyclododecene, and the like are preferred.

As between a DCPD and a norbornene monomer, molar ratio for purposes herein can vary from 100/0–50/50, preferably 95/5–70/30.

The mixing ratio of the oily product (A) and the norbornene monomer (B) can be properly selected as desired. Ordinarily, the oily product (A) is 100–5 weight percent, preferably 100–10 weight percent, and the component (B) is 0–95 weight percent, preferably 0–90 weight percent. It is preferable that in the monomer mixture, aryl tetracyclododecene is present at more than 2 weight percent, preferably more than 3 weight percent, and aryl norbornene is present at more than 5 weight percent, preferably more than 7 weight percent.

If the norbornene monomer is a DCPD, the glass transition temperature of the thermosetting resin will decrease with a decrease in the content of the oily product (A) in the mixture.

In contrast to DCPD, which solidifies at about 33° C., the mixtures thereof with heat treatment reaction products are liquid at 10° C. and the handling or transportation of the liquid is easy. The mixing of the heat-treated product and the norbornene monomer can be readily carried out using a power mixer, static mixer, collision mixer, or other mixers.

As conditions for heat treating, a method may be mentioned in which a mixture of a DCPD and a vinyl aromatic is heated in an inert atmosphere, such as nitrogen gas, at 110°–220° C., preferably 150°–200° C., for 0.5–20 hours, preferably 1–10 hours.

Heat treating may be either of the batch type or the continuous type. In order to control the polymerization of vinyl aromatics, the method for the continuous or intermittent addition of vinyl aromatics and the method for the midway addition of vinyl aromatics into the continuous process are available. Furthermore, it is also possible to heat DCPDs to the temperature mentioned previously for decomposition into CPDs, then to feed them. In this case, heat treating above 50° C. is acceptable.

The resulting polymer can be heat treated to stabilize physical properties thereof. This heat treatment can be carried out at an elevated temperature until a substantially constant impact strength is obtained. This heat treatment is carried out at an elevated temperature for several hours, such as at 80° C. for 72 hours.

It is desirable to carry out heat treating in the presence of an antioxidant. As the antioxidants, those of the phenol system are good. For example, 4,4'-dioxydiphenyl, hydroquinone monobenzyl ether, 2,4-dimethyl-6-t-butyl phenol, 2,6-d-t-butyl phenol, 2,6-diamyl hydroquinone, 2,6-di-t-butyl-p-cresol, 4-hydroxymethyl-2,6-di-t-butyl phenol, 4,4'-methylene-bis-(6-t-butyl-o-cresol), butylated hydroxyl anisole, phenol condensate, butylated phenol, dialkyl phenol sulfide, high molecular weight polyvalent phenols, bisphenol, and so on may be mentioned.

It is also possible to use t-butyl catechol, hydroquinone, resorcinol, pyrogallol, and other polyvalent phenols.

The amounts of the antioxidants to be used are ordinarily 10-10,000 ppm, preferably 100-3,000 ppm, based on DCPDs. Furthermore, it is preferable to use radical polymerization inhibitors in combination therewith.

Examples of radical polymerization inhibitors include p-benzoquinone, p-quinone dioxime, carbanoxyl, and other quinones, tri-p-nitrophenyl methyl, diphenyl picryl hydrazyl, and other nitro compounds, nitroso benzene and other nitroso compounds, p-phenyl diamine and other amino compounds, dimethyl dithiocarbamic acid salts, phenothiazine, and other organic sulfur compounds, and iodine, sulfur, sodium nitrite, and other inorganic compounds may be mentioned. The amount of the radical polymerization inhibitors is 100-3,000 ppm.

The heat-treated products obtained can be used as such as feedstocks for the manufacture of thermosetting resins by ring-opening polymerization. However, it is preferable to remove cyclopentadienes (CPDs), unreacted vinyl aromatics, and other low boiling point substances formed by the decomposition of DCPDs.

The products obtained by the heat treating of DCPDs and vinyl aromatics are generally colorless, transparent, oily substances. Their viscosities are less than 200 centipoise at 30° C., preferably less than 100 centipoise, and more preferably less than 50 centipoise.

Said products contain the unreacted DCPDs, a small amount of unreacted vinyl aromatics, the oligomers of cyclopentadienes (CPDs), codimers of CPDs and vinyl aromatics such as phenyl norbornene, naphthyl norbornene, the Diels-Alder reaction products of CPDs and the previously described codimers such as phenyl tetracyclododecene or naphthyl tetracyclododecene, polymers of vinyl aromatics, and the like.

As the heat-treated products in the present invention, those containing less than 5 weight percent of the unreacted vinyl aromatics, especially less than 2 weight percent, are preferred. If vinyl aromatics are in a large quantity, the glass transition temperature of thermosetting resins will not be sufficiently high.

The content of aryl norbornene as a codimer of CPD and a vinyl aromatic is generally more than 10 weight percent, preferably more than 20 weight percent. Furthermore, the content of aryl tetracyclododecene as a cotrimer of a CPD and a vinyl aromatic is generally more than 3 weight percent, preferably more than 10 weight percent.

The sum of the reaction products of CPDs and vinyl aromatics such as aryl norbornene or aryl tetracyclododecene in the reaction product is more than 15 weight percent, preferably more than 30 weight percent. If said reaction products are increased, the glass transition temperature of the thermosetting resin is increased and the impact strength is also improved. Therefore, higher contents are more preferable.

The contents of the oligomers with the trimers and tetramers of CPDs as the major components are generally less than 40 weight percent, preferably less than 25 weight percent. If the contents of said oligomers are high, the heat-treated products will be white turbid or waxy and handling will be difficult. Furthermore, with an increase in said oligomers, the glass transition temperature of the thermosetting resins is increased. On the other hand, the impact resistance, especially the impact resistance after the heat-resistance deterioration test, will decrease undesirably.

The sum of aryl norbornene and aryl tetracyclododecene is preferably more than the same amount of the CPD oligomers, especially more than twice, for the physical properties of thermosetting resins.

The contents of the polymers of vinyl aromatics, like polystyrene, are less than 30 weight percent, preferably 0.1-15 weight percent. Within this range, the polymerization activity will not be damaged. Furthermore, the physical properties of the thermosetting resins formed are essentially unaffected. However, if the content is too high, the viscosity of the heat-treated product will be too high and difficulty in operability will occur. Furthermore, the glass transition temperature is also decreased.

In the present invention, an elastomer may also be present mainly from the viewpoint of improving the impact strength. The elastomers which can be used include natural rubber, polybutadiene, styrene-butadiene copolymer (SBR), polyisoprene, styrene-butadiene-styrene block copolymer (SBS), styrene-isoprene-styrene block copolymer (SIS), ethylene-propylene-diene terpolymer (EPDM), ethylene-vinyl acetate copolymer (EVA), and their hydrides. The elastomers may be used alone or as a mixture of two or more.

The elastomer is generally used by pre-dissolving it in a reaction solution containing the previously mentioned product (A) or a mixture of said product (A) and norbornene monomer (B).

If a reaction solution containing a monomer has a low viscosity, the viscosity of such a reaction solution can be properly adjusted by dissolving the elastomer therein.

The amounts of these elastomers are ordinarily 0.5-20 parts by weight, preferably 1-15 parts by weight, with respect to 100 parts by weight of the thermosetting resins. If the amount of the elastomer is too low, the effect of rendering the impact resistance will be small. On the other hand, if it is too high, the viscosity of the reaction solution will be too high and the molding operability will be poor. Furthermore, the thermal deformation temperature or the flexural modulus of the thermosetting resin composition will decrease if too much elastomer is used.

As the catalyst components of the metathesis catalyst system for use in the present invention, any of the metathesis catalyst systems known as the catalysts for the bulk polymerization of norbornene monomers are acceptable. This includes those disclosed by Japanese Kokai Patents Nos. Sho 58[1983]-127728, Sho 58[1983]-129013, Sho 59[1984]-51911, Sho 60[1985]-79035, Sho 60[1985]-186511, and Sho 61[1986]-126115, U.S. Pat. Nos. 4,380,617, 4,400,340, and 4,481,344, European Unexamined Patents 142,861 and 181,642. These are no special instructions.

As suitable catalysts, halides, oxyhalides, oxides, organic ammonium salts, and so on of tungsten, molybdenum, tantalum, and the like may be mentioned. Specific examples include tungsten hexachloride, tungsten oxytetrachloride, tungsten oxide, tridodecylammonium tungstate, methyltricaprylammonium tungstate, tri(tridecyl)ammonium tungstate, trioctylammonium tungstate, and other tungsten compounds; molybdenum pentachloride, molybdenum oxytrichloride, tridodecylammonium molybdate, methyltricapryl trioctylammonium molybdate, and other molybdenum compounds; and tantalum pentachloride and other tantalum compounds. Among these, it is preferable to use the catalysts which are soluble in the oily product or the norbornene monomer. From this viewpoint, organic ammonium salts are preferred. If the catalyst is a halide, it can be solubilized by pretreatment with an alcohol compound or a phenol compound. Furthermore, if necessary, benzonitrile, tetrahydrofuran, and other Lewis bases, acetyl acetone, acetoacetic acid alkyl esters, and other chelating agents may be used in combination. By doing so, pre-polymerization can be prevented.

The activators or cocatalysts of the metathesis catalyst system include alkylaluminum halides, alkoxyalkylaluminum halides, aryloxyalkylaluminum halides, and organic tin compounds. Specific examples of suitable cocatalysts also include ethylaluminum dichloride, diethylaluminum monochloride, ethylaluminum sesquichloride, diethylaluminum iodide, ethylaluminum diiodide, propylaluminum dichloride, propylaluminum diiodide, isobutylaluminum dichloride, ethylaluminum dibromide, methylaluminum sesquichloride, methylaluminum sesquibromide, tetrabutyltin, and reaction products of alkylaluminum halides with an alcohol.

Among these activators, an alkoxyalkylaluminum halide or aryloxyalkylaluminum halide can be adjusted to have a proper pot life at room temperature. Specific examples include those in Japanese Kokai Patent No. Sho 59[1984]—51911 and U.S. Pat. No. 4,426,502. In the case of an alkylaluminum halide, polymerization can be initiated immediately when a catalyst is mixed with it. In such a case, the initiation of polymerization can be delayed using an activator modified with an ether, ester, ketone, nitrile, or an alcohol, see, for example, Japanese Kokai Patents Nos. Sho 58[1983]-129013, Sho 61[1986]-210814, and U.S. Pat. No. 4,400,340. If these modifiers are not used, it will be necessary to take into account aspects of the apparatus and operation so that those with a short pot life can also be used. Furthermore, it is also acceptable to use, in addition to the catalyst and the activator, a halogen source such as chloroform, carbon tetrachloride, hexachlorocyclopentadiene, other halogenated hydrocarbons, silicon tetrachloride, magnesium tetrachloride, lead tetrachloride, and other metal halides, as disclosed by, for example, Japanese Kokai Patent No. Sho 60[1985]-79035 and U.S. Pat. No. 4,481,344.

The catalyst component can ordinarily be used at a ratio 0.05-1 part by weight, preferably 0.1-0.7 part by weight, based on 100 parts by weight of the total monomer, i.e., the total amount of oily product (A) and the norbornene monomer (B) if the norbornene monomer is used.

The activators or cocatalysts are ordinarily used at a molar ratio of 0.1-200, preferably 2-10 with respect to the catalyst components.

It is preferable to use both the metathesis catalyst and the activator by dissolving them in monomers. However, they may also be used in suspension or dissolved in a small amount of a solvent.

In the present invention, the thermosetting resin is prepared by a polymerization method in which a monomer and metathesis catalyst system are introduced into a mold of a desired shape and bulk polymerization is carried out in the mold. It does not matter if a small amount of an inert solvent is present.

Ordinarily, the monomer is divided into two liquids placed in separate vessels. A metathesis catalyst is added into one of them, and an activator is added into the other so that two stable reaction solutions are prepared. If an elastomer is used, it is dissolved in either or both of these reaction solutions.

These two reaction solutions are mixed then poured into a forming mold maintained at an elevated temperature. The ring-opening polymerization is initiated here to yield a thermosetting resin.

The impingement mixing apparatus known conventionally as a RIM molding apparatus in the present invention can be used for mixing of the two reaction solutions. In this case, the vessels containing the two reaction solutions are used as supply sources of separate streams. The two streams are instantaneously mixed within a mixing head of a RIM machine. Next, it is poured into a high temperature mold where bulk polymerization is immediately carried out to yield a thermosetting resin.

Although the impingement mixing apparatus can be used in this manner, the present invention is not restricted to such a mixing means. If the pot life at room temperature is more than 1 hour after completion of the mixing of the two reaction solutions in the mixer, it may be injected or poured into a preheated mold, as described, for example, in Japanese Kokai Patent No. Sho 59[1984]-51911 and U.S. Pat. No. 4,426,502, or it can be poured continuously. In this type of apparatus, the mixture can be injected into a mold as with the impingement mixer. Furthermore, such RIM apparatus has an advantage of operating at a low pressure.

In addition, the present invention is not restricted to a method using two reaction solutions. As is easily understandable by those in the industry, a variety of modifications is possible, for example, a monomer and a desired additive may be placed in the third vessel for use as a third stream.

The mold temperature is ordinarily more than 30° C., preferably 40°-200° C., more preferably 50°-120° C. The mold pressure is generally 0.1 to 100 kg/cm$^2$.

The polymerization time can be properly selected. Ordinarily, it is shorter than about 20 minutes and preferably shorter than 5 minutes. However, it may be longer than this.

The reaction solutions are generally stored or handled under an inert gas atmosphere, such as nitrogen gas. However, if a solution is insensitive to atmosphere, it need not be stored or handled in an inert atmosphere. The mold need not necessarily be sealed with an inert gas.

By blending fillers, foaming agents, flame retardants, antioxidants, pigments, coloring agents, high molecular weight reforming agents, and a variety of other additives, or using glass fibers, carbon fibers, aramide fibers, glass mats, and other reinforcing materials, the characteristics of the thermosetting resins of the present invention can be reformed.

The additives may be blended with one or both of the reaction solutions or placed in the cavity of the mold.

Examples of fillers or reinforcement agents include milled glass, carbon black, talc, calcium carbonate, mica, and other inorganic fillers.

In addition to elastomers used as the high molecular weight agents, there are hydrogenation additives for the thermally polymerized DCPD resins. They are dissolved in the reaction solutions.

The bulk polymers obtained by the method of the present invention are thermosetting resins which become hard solids upon cooling. The glass transition temperature (Tg) depends on the monomer composition. However, Tg is higher than Tg for the homopolymers of dicyclopentadienes. It is generally higher than 120° C., preferably higher than 140° C.

Furthermore, in comparison with the conventional method using cyclopentadiene oligomers as comonomers, the copolymers herein have a much higher impact strength. In particular, the improvement in the impact strength after thermal treatment is remarkable.

The following examples are presented so that the present invention can be more specifically explained. However, the present invention is not to be restricted to these examples. Parts, ratios and percentages are all on a weight basis.

EXAMPLE 1

50 parts of 98.5% purity DCPD containing 500 ppm of 2,6-di-tert-butyl phenol (BHT) and 100 ppm of t-butyl catechol with 50 parts of 99.90% purity styrene where charged into an autoclave. The molar ratio of DCPD to styrene was 44:56. After sufficient nitrogen sparging, the mixture was heated to 170° C. and reacted for 4 hours. Afterwards, it was cooled to 80° C. and evacuated to 5 Torr. 1.9 parts of a low boiling point substance were removed by evaporation from the autoclave. It was then cooled to room temperature to yield 98.1 parts of a colorless, transparent, oily substance. This oily substance had a viscosity of about 20 centipoise at 30° C. and the freezing point was under −10° C.

The composition of the oily product was as follows:
Unreacted DCPD: 14%
Unreacted styrene: 1%
Trimer and Tetramer of CPD: 10%
Phenyl norbornene: 43%
Phenyltetracyclodecene: 21%
Polystyrene: 10%
Other high-boiling-point substances: 1%

This oily product was placed in two vessels. To one vessel were added 0.4 part diethylaluminum chloride (DEAC), 0.15 part n-propanol, 0.36 part silicon tetrachloride, and 5 parts styrene-isoprene-styrene block copolymer Kraton 1170, manufactured by the Shell Co. This was Solution A.

To the other vessel, 0.3 part tri(tridecyl)ammonium molybdate was added per 100 parts of the oily product. This was Solution B.

Solution A and Solution B were pumped with gear pumps to a mixer so that they were in a volumetric ratio of 1:1. Next, it was rapidly poured into a mold having a volume of 200 mm×200 mm×3 mm and heated to 70° C. The pouring time was about 10 seconds. Reaction was carried out in the mold for 3 minutes. A series of these operations was carried out in a nitrogen gas atmosphere.

The glass transition temperature (Tg) measured with a differential scanning calorimeter of a product obtained in this manner was measured to be 158° C. The DuPont impact value (exhibiting the fracture strength during the falling of a hammer having a front tip shape with a radius of 7.9 mm according to the falling hammer impact strength of JIS K 7211) was 600 kg/cm.

The DuPont impact strength after heat treatment of the polymer at 80° C. for 72 hours was 250 kg/cm.

EXAMPLE 2

Using the heat-treated product of Example 1, mixtures with DCPD at the compositions shown in Table I were prepared. In the same manner as in Example 1, Solution A and Solution B were prepared. By forming, molded products were obtained. The various physical properties of these molded products are shown in Table I.

In regard to the freezing points of the mixtures, none of the mixtures of the present invention froze even at −10° C., compared with the fact that DCPD froze at 33° C.

TABLE I

|  | Present Invention | | | Comparative Examples |
|---|---|---|---|---|
| Test Nos. | 2-1 | 2-2 | 2-3 | 2-4 |
| DCPD/Product Mixing Ratio | 30/70 | 50/50 | 70/30 | 100/0 |
| Glass Transition Temperature (Tg) | 156 | 154 | 153 | 150 |
| Du Pont Impact Value (kg/cm) | 600 | 500 | 400 | 250 |
| Du Pont Impact Value after 80° C. @72 hours. (kg/cm) | 250 | 170 | 150 | 100 |

EXAMPLE 3

Oily products were obtained by the same operation as in Example 1 except that the amounts of the DCPD and styrene feedstocks charged were those shown in Table II. The compositions of the oily products obtained, the presence or absence of the white turbidity state in the solutions, and the freezing points are shown in Table II.

Molded products were obtained in the same manner as in Example 1 except that these oily products were used. The various physical properties of the molded products obtained are shown in Table II.

TABLE II

|  | Comparative Examples | Examples of the Present Invention | |
|---|---|---|---|
| Test Nos. | 1 | 2 | 3 |
| Amounts of feedstocks charged (molar ratios) | 100 | 65 | 34 |
| Styrene | 0 | 35 | 66 |
| Compositions of reaction products | | | |
| Unreacted DCPD | 40 | 27 | 8 |
| Unreacted styrene | — | 0.4 | 2 |
| Trimer and tetramer of CPD | 60 | 18 | 3 |
| Phenyl norbornene | — | 29 | 49 |
| Phenyl tetracyclododecene | — | 17 | 24 |
| Polystyrene | — | 8 | 14 |
| Others | — | 0.6 | 24 |
| States of the reaction products | | | |
| White turbidity state | Waxy, white precipitate in a large quantity | Colorless, transparent | Colorless, transparent |
| Freezing point (°C.) | 50 | −10> | −10> |
| RIM molded products | | | |
| Glass transition temperature. (°C.) | 190 | 168 | 150 |
| DuPont impact value (kg/cm) | 150 | 600 | >700 |

TABLE II-continued

| | Comparative Examples | Examples of the Present Invention | |
|---|---|---|---|
| Test Nos. | 1 | 2 | 3 |
| DuPont impact value after 80° C. @72 hours (kg/cm) | 40 | 220 | 250 |

EXAMPLE 4

Using 50 parts of 98.5% purity DCPD containing 100 ppm of t-butyl catechol and 1,000 ppm of 4,4'-methylene-bis-(6-t-butyl-o-cresol) with 50 parts of 98.0% purity vinyltoluene, the same heat treatment as in Example 1 was carried out. A colorless, transparent, oily product with a viscosity of 10 cps at 30° C. was obtained.

The composition of this oily product was as follows:
Unreacted DCPD: 8%
Unreacted vinyltoluene: 2%
Trimer and Tetramer of CPD: 15%
Tolyl norbornene: 51%
Tolyl tetracyclododecene: 17%
Polyvinyltoluene and other higher boiling point substances: 7%

A molded product was obtained by the same method as in Example 1 except that a mixture of 30 parts of this oily product and 70 parts of DCPD was used.

The freezing point of the mixture was under −10° C. The glass transition temperature (Tg) of the molded product obtained was 155° C. The DuPont impact value was 600 kg/cm and was 250 kg/cm after thermal treatment.

EXAMPLE 5

In this example, a continuous feeding technique is demonstrated.

A reaction solution obtained by mixing equal weights of 98.5% purity DCPD containing, 1,000 ppm of 4,4'-methylenebis(2,6-di-t-butyl phenol) and 99.9% purity styrene was supplied at a feeding rate of 1.0 liter per hour through a feedstock supply tube into a 3 liter reactor equipped with a heating and cooling device outside and maintained at a constant temperature of 160° C.

The solution leaving said reactor was introduced through another product solution outlet tube into a separate 3-liter reactor. Afterwards, it was passed through a product solution outlet tube and a constant-pressure valve into a flash distillation column operating at a vacuum of 5 Torr. Here, at a rate of 0.05 liter/hr, the low boiling point substance was vaporized, liquefied by a condensation heat exchanger, and removed from the system.

The heat-treated product was supplied to the desired application through an outlet tube. The heat-treated product obtained was colorless and transparent. Its composition was as follows:
Unreacted DCPD: 12%
Unreacted styrene: 2%
Trimer and tetramer of CPD: 8%
Phenyl norbornene: 51%
Phenyl tetracyclododecene: 17%
Polystyrene: 9%
Others: 1%

A molded product was obtained in the same manner as in Example 1 except that a mixture consisting of 30 parts of this oily product and 70 parts of DCPD was used.

The freezing point of the mixture was under −10° C. The glass transition temperature of the molded product obtained was 155° C. The DuPont impact value was 500 kg/cm and the DuPont impact value after the thermal treatment was 200 kg/cm.

EXAMPLE 6

As in Example 5, in addition to the supply from the feedstock supply tube, a feedstock solution consisting of 30 parts of DCPD and 70 parts of styrene was supplied additionally at a rate of 0.3 liter/hr through another feedstock supply tube into a reactor. The molar ratio of DCPD to styrene in the total supplied feedstocks was 40:60. The oily product obtained was colorless and transparent. Its composition was as follows:
Unreacted DCPD: 15%
Unreacted styrene: 2%
Trimer and tetramer of CPD: 5%
Phenyl norbornene: 53%
Phenyl tetracyclododecene: 21%
Polystyrene: 3%

A molded product was obtained by the same method as in Example 1 except that a mixture consisting of 30 parts of this oily product and 70 parts of DCPD was used.

The freezing point of the mixture was under −10° C. The glass transition temperature of the molded product was 165° C. The DuPont impact value was 500 kg/cm and the DuPont impact value after the thermal treatment was 190 kg/cm.

EXAMPLE 7

A reaction was carried out according to Example 5 except that DCPD was supplied additionally through a feedstock supply tube at a rate of 0.3 liter/hour, heated to 180° C. in a heat exchanger with an internal volume of 0.2 liter, and supplied into a reactor, as in Example 5. The molar ratio of the DCPD to styrene in the total supplied feedstocks was 56:44.

The oily product obtained was colorless and transparent. Its composition was as follows:
Unreacted DCPD: 18%
Unreacted styrene: 1%
Trimer and tetramer of CPD: 8%
Phenyl norbornene: 45%
Phenyl tetracyclododecene: 23%
Polystyrene: 3%
Others: 2%

A molded product was obtained by the same method as in Example 1 using a mixture consisting of 20 parts of this oily product and 80 parts of DCPD.

The freezing point of the mixture was under −10° C. The glass transition temperature of the molded product obtained was 170° C. The DuPont impact value was 600 kg/cm and the DuPont impact value after the thermal treatment was 220 kg/cm.

According to the present invention, using an oily, easy to handle monomer obtained from a DCPD and a vinyl aromatic compound as feedstocks, a thermosetting resin can be obtained with a better thermal deformation temperature (glass transition temperature) and falling-hammer impact strength, especially the falling-hammer impact strength after thermal treatment, than with the conventional DCPD polymers. The thermosetting resin of this invention has an excellent effectiveness which makes it possible for use in a variety of fields where heat resistance and impact strength are required.

What is claimed is:

1. A process for preparing a polymer comprising polymerizing by ring-opening in the presence of a metathesis catalyst a reaction product of a dicyclopentadiene and a vinyl aromatic compound which can undergo the Diels-Alder reaction with cyclopentadiene, with or without a norbornene monomer, said norbornene monomer contains at least one norbornene group in its structure, said reaction product is obtained by heat treating a dicyclopentadiene and a vinyl aromatic compound in an inert atmosphere at a temperature range between about 110° to about 220° C. for a time period of about 0.5 to about 20 hours wherein the molar ratio of said dicyclopentadiene to said vinyl aromatic compound ranges from about 70/30 to about 30/70.

2. The process of claim 1 wherein said dicyclopentadiene is selected from dicyclopentadiene itself, substituted dicyclopentadienes, and mixtures thereof, wherein substituted dicyclopentadienes contain substituents selected from polar groups, nonpolar groups, and mixtures thereof.

3. The process of claim 1 for preparing a thermoset polymer wherein said dicyclopentadiene is dicyclopentadiene itself of a purity greater than 90 weight percent; said vinyl aromatic compound is selected from styrene, alphamethylstyrene, vinyl toluene, isopropenyltoluene, p-t-butylstyrene, halogenated styrene, vinyl naphthalene, and mixtures thereof.

4. The process of claim 3 wherein said heat treating step is carried out at 150°-200° C. in 1-10 hours.

5. The process of claim 4 wherein weight ratio of said reaction product to said norbornene monomer is in the range of 100/0-5/95.

6. The process of claim 4 wherein weight ratio of said reaction product to said norbornene monomer is in the range of 100/0-10/90, said heat treating step is carried out in an inert atmosphere; and said step of polymerizing is carried out at a pressure of 0.1 to 100 kg/cm$^2$.

7. The process of claim 3 including 0.5-20 weight parts of an elastomer, per 100 weight parts of said thermosetting polymer.

8. The process of claim 4 including 10-10,000 ppm of an antioxidant, based on the dicyclopentadiene.

9. The process of claim 3 including 1-15 weight parts of an elastomer, per 100 weight parts of said thermosetting polymer, and 100-3,000 ppm of an antioxidant, based on dicyclopentadiene.

10. The process of claim 3 comprising combining a plurality of streams, one of which contains said reaction product and a catalyst component of a metathesis catalyst system, and a second which contains said reaction product and a cocatalyst component of a metathesis catalyst system, mixing said one and second streams, and injecting into a mold the mixture of said one and second streams where said polymerization occurs.

11. The process of claim 10 including the step of polymerizing said mixture in the mold at a temperature of 40°-200° C.

12. The process of claim 11 wherein weight ratio of said reaction product to said norbornene monomer is in the range of 100/0-5/95.

13. The process of claim 12 wherein said one and said second streams include 0.5-20 weight parts of an elastomer, per 100 weight parts of said thermosetting polymer.

14. The process of claim 13 including 1-15 weight parts of an elastomer, per 100 weight parts of said thermosetting polymer, and 100-3,000 ppm of an antioxidant, based on dicyclopentadiene.

15. The process of claim 13 wherein said elastomer is selected from the group consisting of natural rubber, polybutadiene, styrene-butadiene copolymer, polyisoprene, styrene-butadiene-styrene block copolymer, styrene-isoprene-styrene block copolymer, ethylene-propylene-diene terpolymer, ethylene-vinyl acetate copolymer, ethylvinyl acetate copolymer and mixtures thereof.

16. The process of claim 1 wherein said norbornene monomer is selected from the group consisting of substituted or unsubstituted norbornenes, cyclopentadienes, dicyclopentadienes, dihydrocyclopentadienes, tricyclopentadienes, tetracyclopentadienes, tetracyclododecenes, and mixtures thereof.

17. The process of claim 1 wherein said norbornene monomer is selected from the group consisting of cyclopentadiene, tetracyclododecene, ethyl tetracyclodecene; ethylidene tetracyclododecene, phenyl tetracyclododecene; 2-norbornene; 5-methyl-2-norbornene; 5-dodecyl-2-norbornene; 5-ethyl-2-norbornene; 5-butyl-2-norbornene; 5-hexyl-2-norbornene; 5-octyl-2-norbornene; 5-dodecyl-2-norbornene, norbornene, norbornadiene; ethylidene norbornene, vinyl norbornene, phenyl norbornene and mixtures thereof.

18. A composition comprising a reaction product and a catalyst component selected from ring-opening metathesis catalysts, ring-opening metathesis cocatalysts, and mixtures thereof; said reaction product is obtained by heating a dicyclopentadiene and a vinyl aromatic compound capable of undergoing Diels-Adler reaction with cyclopentadiene in an inert atmosphere and at a temperature range between about 100° to about 220° C. for a time period of about 0.5 to about 20 hours wherein the molar ratio of said dicyclopentadiene to said vinyl aromatic compound ranges from about 70/30 to about 30/70.

19. The composition of claim 18 wherein said heating is carried out at 150° to 200° C. for a period of time of 1 to 10 hours, wherein said reaction product is an oily and transparent liquid at room temperature.

20. The composition of claim 18 wherein said dicyclopentadiene is unsubstituted dicyclopentadiene; said vinyl compound is selected from the group consisting of styrene, alpha-methylstyrene, vinyltoluene, isopropenyltoluene, p-t-butylstyrene, halogenated styrene, vinylnaphthalene, and mixtures thereof; said catalysts are selected from the group consisting of organic ammonium salts of tungsten, molybdenum, tantalum, and mixtures thereof; said cocatalysts are selected from the group consisting of alkylaluminum halides, alkoxyalkylaluminum halides, aryloxyalkylaluminum halides, organic tin compounds, and mixtures thereof; and said heating is carried out at 150°-200° C. in 1-10 hours.

21. The composition of claim 18 including 0.5-20 weight parts elastomer, per 100 weight parts of said dicyclopentadiene.

22. The composition of claim 18 wherein said reaction product has viscosity of less than 100 cps at 30° C., contains less than 5% by weight of unreacted vinyl aromatic compound, more than 20% by weight aryl norbornene as a codimer of cyclopentadiene and said vinyl aromatic compound, and more than 10% by weight of aryl tetracyclododecene, as a cotrimer of cyclopentadiene and said vinyl aromatic compound.

23. The composition of claim 18 wherein said reaction product has viscosity of less than 100 cps at 30° C. and contains more than 30% by weight of aryl norbornene and aryl tetracyclododecene.

24. A ring opened polymer polymerized from the composition of claim 18.

25. Polymer of claim 24 having a glass transition temperature in the range of from about 140° C. to about 170° C. and having an impact strength in the range of from about 150 kg/cm to about 250 kg/cm after heat treatment at 80° C. for 72 hours.

26. The composition of claim 18 further comprising a norbornene monomer.

27. The composition of claim 26 wherein said norbornene monomer is selected from the group consisting of unsubstituted norbornenes, cyclopentadienes, dicylopentadienes, dihydrodicyclopentadienes, tricyclopentadienes, tetracyclopentadienes, tetracyclododecenes, and mixtures thereof.

28. The composition of claim 27 wherein said norbornene monomer is selected from the group consisting of cyclopentadiene, tetracyclododecene, ethyl tetracyclodecene; ethylidene tetracyclododecene, phenyl tetracyclododecene; 2-norbornene; 5-methyl-2-norbornene; 5-dodecyl-2-norbornene; 5-ethyl-2-norbornene; 5-butyl-2-norbornene; 5-hexyl-2-norbornene; 5-octyl-2-norbornene; 5-dodecyl-2-norbornene, norbornene, norbornadiene; ethylidene norbornene, vinyl norbornene, phenyl norbornene and mixtures thereof.

29. The composition of claim 18 or 26 further comprising an elastomer.

30. The composition of claim 29 wherein said elastomer is selected from the group consisting of natural rubber, polybutadiene, styrene-butadiene copolymer, polyisoprene, styrene-butadiene-styrene block copolymer, styrene-isoprene-styrene block copolymer, ethylene-propylene-diene terpolymer, ethylene-vinyl acetate copolymer, ethylvinyl acetate copolymer and mixtures thereof.

31. A ring-opened polymer polymerized from the composition of claim 26.

32. A ring-opened polymer polymerized from the composition of claim 29.

* * * * *

UNITED STATES PATENT AND TRADEMARK OFFICE
CERTIFICATE OF CORRECTION

PATENT NO. : 5,138,003

DATED : August 11, 1992

INVENTOR(S) : Kin-ichi Okumura, Munetoshi Nakano, Hirotoshi Tanimoto, and Motoyuki Yamato It is certified that error appears in the above-identified patent and that said Letters Patent is hereby corrected as shown below:

In column 12, line 21, after "Polystyrene: 3%" insert --Others: 1%-- as a separate paragraph.

In column 15, line 12 before "unsubstituted" insert --substituted or--.

Signed and Sealed this

Twenty-first Day of September, 1993

Attest:

*Attesting Officer*

BRUCE LEHMAN

*Commissioner of Patents and Trademarks*